(12) United States Patent
Chou

(10) Patent No.: US 7,824,042 B2
(45) Date of Patent: Nov. 2, 2010

(54) PROJECTOR WITH LAMP COVER LOCK

(75) Inventor: Cheng-Hung Chou, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 537 days.

(21) Appl. No.: 11/967,020

(22) Filed: Dec. 29, 2007

(65) Prior Publication Data

US 2009/0115976 A1    May 7, 2009

(30) Foreign Application Priority Data

Nov. 5, 2007    (CN) .......................... 2007 1 0202387

(51) Int. Cl.
    *G03B 21/14*    (2006.01)
(52) U.S. Cl. ...................................... 353/119; 353/122
(58) Field of Classification Search ................. 353/88, 353/97, 101, 119, 85, 87, 122, 55; 348/794
    See application file for complete search history.

(56) References Cited

U.S. PATENT DOCUMENTS 6,398,366 B1 *  6/2002  Hara et al. .................... 353/57
7,210,320 B1    5/2007  Nokleberg

* cited by examiner

*Primary Examiner*—Tony Ko
(74) *Attorney, Agent, or Firm*—Jeffrey T. Knapp

(57) ABSTRACT

A projector has a disassembling lock for preventing the lamp cover from being disassembled when the projector is secured to a ceiling. The disassembling lock includes a sleeve, a latching rod, a stop block, and a coil spring. The sleeve is secured in the projector and has a first sleeve portion and a second sleeve portion. The latching rod has a first rod portion, a second rod portion, and a flange formed between the first rod portion and the second rod portion, the flange is slidable inside the first sleeve portion. The stop block is fixed in a distal end of the first sleeve portion away from the second sleeve portion, the stop block defines a hole for the first rod portion sliding to the lamp cover. The coil spring is coiled around the first rod portion and held between the flange and the stop block.

12 Claims, 2 Drawing Sheets

PROJECTOR WITH LAMP COVER LOCK

TECHNICAL FIELD

The present invention relates to a projector, and, particularly, to a lock for a lamp cover of a projector which can be secured to a ceiling.

DESCRIPTION OF RELATED ART

Hitherto, a projector has been known which includes a light-source unit having a light source, an electro-optical device for forming an optical image according to image information by using a light beam emitted from the light source, a projection lens for enlarging and projecting the image formed by the electro-optical device, and an outer casing for housing these components. Such projectors are widely used for multimedia presentations at conferences, academic meetings, exhibitions, and the like.

One kind of these projectors is secured to a ceiling when being used for multimedia presentations at conferences, academic meetings, exhibitions, and the like. However, over time, the lamp of the projector may need to be replaced. When a user goes to change the lamp they must look up at the projector, as it is mounted on the ceiling and are then at risk of debris falling into their eye when the remove the lamp cover (especially if the lamp is broken).

What is needed, therefore, is a projector that can overcome the above-described shortcomings.

SUMMARY

In accordance with one present embodiment, a projector includes an upper cover, a lower cover opposite to the upper cover, a lamp cover, and a disassembling lock for preventing the lamp cover from being disassembled when the projector is secured to a ceiling. The lamp cover has a latching groove facing the lower cover. The disassembling lock includes a sleeve, a latching rod, a stop block, and a coil spring. The sleeve is secured in the projector with two ends thereof aligned with the through hole of the upper cover and the lower cover respectively, the sleeve has a first sleeve portion and a second sleeve portion near the lower cover and the upper cover respectively. The latching rod has a first rod portion, a second rod portion, and a flange formed between the first rod portion and the second rod portion, the flange is slidable inside the first sleeve portion. The stop block is fixed in an end of the first sleeve portion away from the second sleeve portion, the stop block defines a hole for the first rod portion sliding to the lamp cover and inserting into the latching groove. The coil spring is coiled around the first rod portion and held between the flange and the stop block.

Other novel features and advantages will become more apparent from the following detailed description when taken in conjunction with the accompanying drawings.

BRIEF DESCRIPTION OF THE DRAWINGS

Many aspects of the present projector can be better understood with reference to the following drawings. The components in the drawing are not necessarily drawn to scale, the emphasis instead being placed upon clearly illustrating the principles of the present projector.

DETAILED DESCRIPTION OF THE EMBODIMENTS

Embodiments of the present invention will now be described in detail below, with reference to the drawings.

Figure 1:
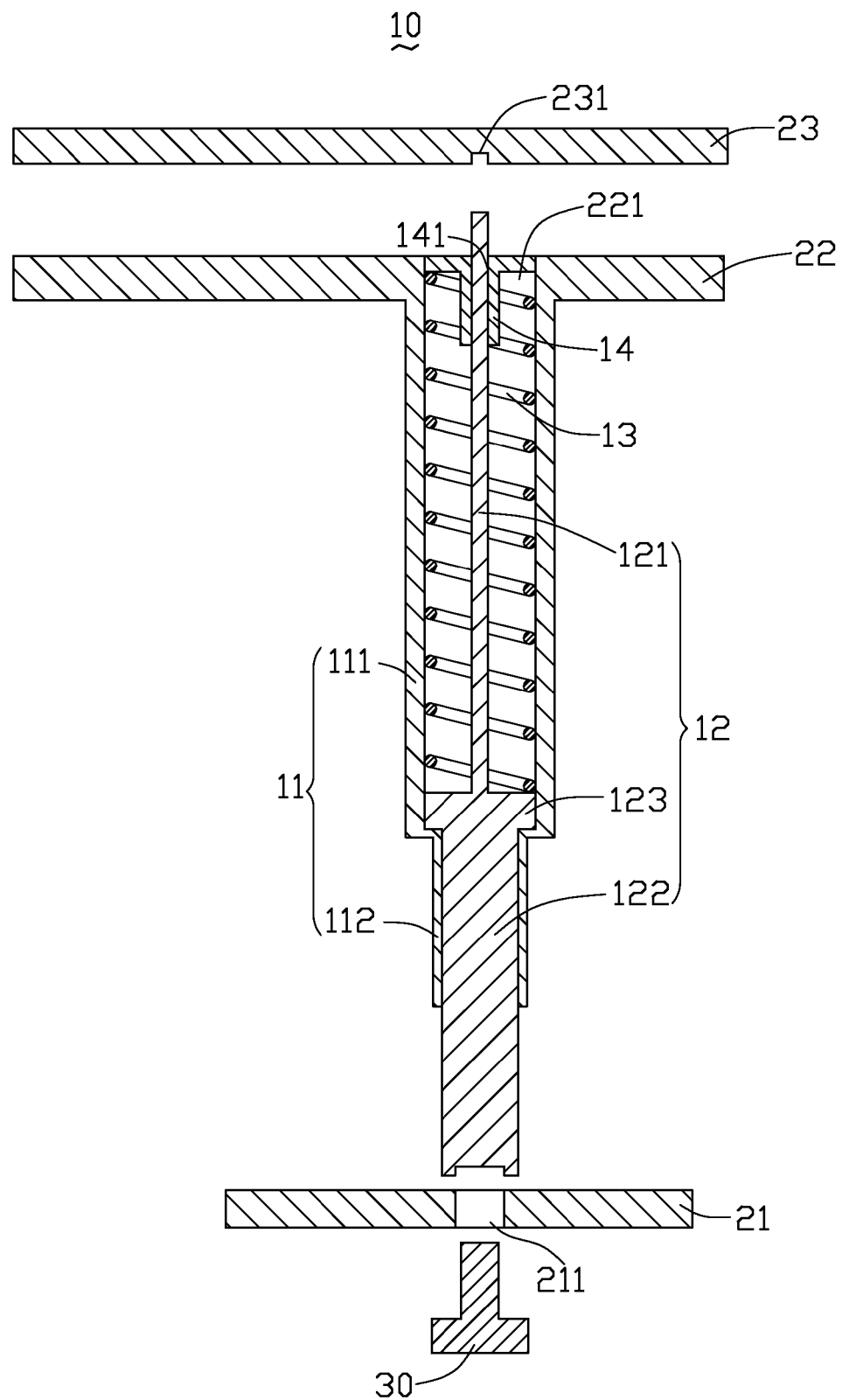
FIG. 1 is a cross-sectional unlocked view of a disassembling lock for a lamp cover of a projector according to a present embodiment.

Referring to FIG. 1, a disassembling lock 10 includes a sleeve 11, a latching rod 12, a coil spring 13, and a stop block 14. The disassembling lock 10 is configured for preventing a lamp cover 23 of a projector from being disassembled when the projector is secured to a ceiling such as with screw fasteners 30 for example.

The sleeve 11 is secured in the projector with two ends thereof facing an upper cover 21 and a lower cover 22 of the projector respectively. When the projector is secured to the ceiling, the upper cover 21 is adjacent to the ceiling and the lower cover 22 faces away from the ceiling. The upper cover 21 and the lower cover 22 have two through holes 211 and 221 corresponding to the two ends of the sleeve 11 respectively. In the present embodiment, the sleeve 11 is arranged on the lower cover 22 of the projector. Preferably, the sleeve 11 is integrally formed with the lower cover 22. It is understood that, the sleeve 11 can be secured to the upper cover 21 instead of the lower cover 22.

The sleeve 11 includes a first sleeve portion 111 and a second sleeve portion 112 communicating with the first sleeve portion 111. The internal diameter of the first sleeve portion 111 is bigger than that of the second sleeve portion 112. In the present embodiment, the sleeve 11 is secured to the lower cover 22 with the first sleeve portion 111 near the lower cover 22.

The latching rod 12 is received in the sleeve 11. The latching rod 12 includes a first rod portion 121, a second rod portion 122, and a flange 123 formed between the first rod portion 121 and the second rod portion 122. In the present embodiment, the first rod portion 121 and the flange 123 are received in the first sleeve portion 111, and the second rod portion 122 is received in the second sleeve portion 112. The diameter of the flange 123 is bigger than the internal diameter of second sleeve portion 112. The flange 123 is slidable inside the first sleeve portion 111 together with the first rod portion 121 and the second rod portion 122.

The coil spring 13 is coiled around the first rod portion 121 received in the first sleeve portion 111. The coil spring 13 is held between the flange 123 and the stop block 14, and is in a compressed state inside the first sleeve portion 111.

The stop block 14 is fixed in an end of the first sleeve portion 111 away from the second sleeve portion 112. The stop block 14 has a hole 141 at the center thereof. The diameter of the hole 141 is bigger than that of the first rod portion 121 and smaller than outer diameter of the coil spring 13. The first rod portion 121 can slide through the hole 141 to prevent the lamp cover 23 from sliding along the surface of the lower cover 22 of the projector. At present, most of the lamp cover 23 of the projector needs to be slid along the surface of the lower cover 22 of the projector first for disassembling the lamp cover 23 from the projector. So, the lamp cover 23 cannot be disassembled because it is prevented from sliding along the surface of the lower cover 22 while the projector is secured to the ceiling. In the present embodiment, the lamp cover 23 has a latching groove 231 corresponding to the first rod portion 121.

Figure 2:
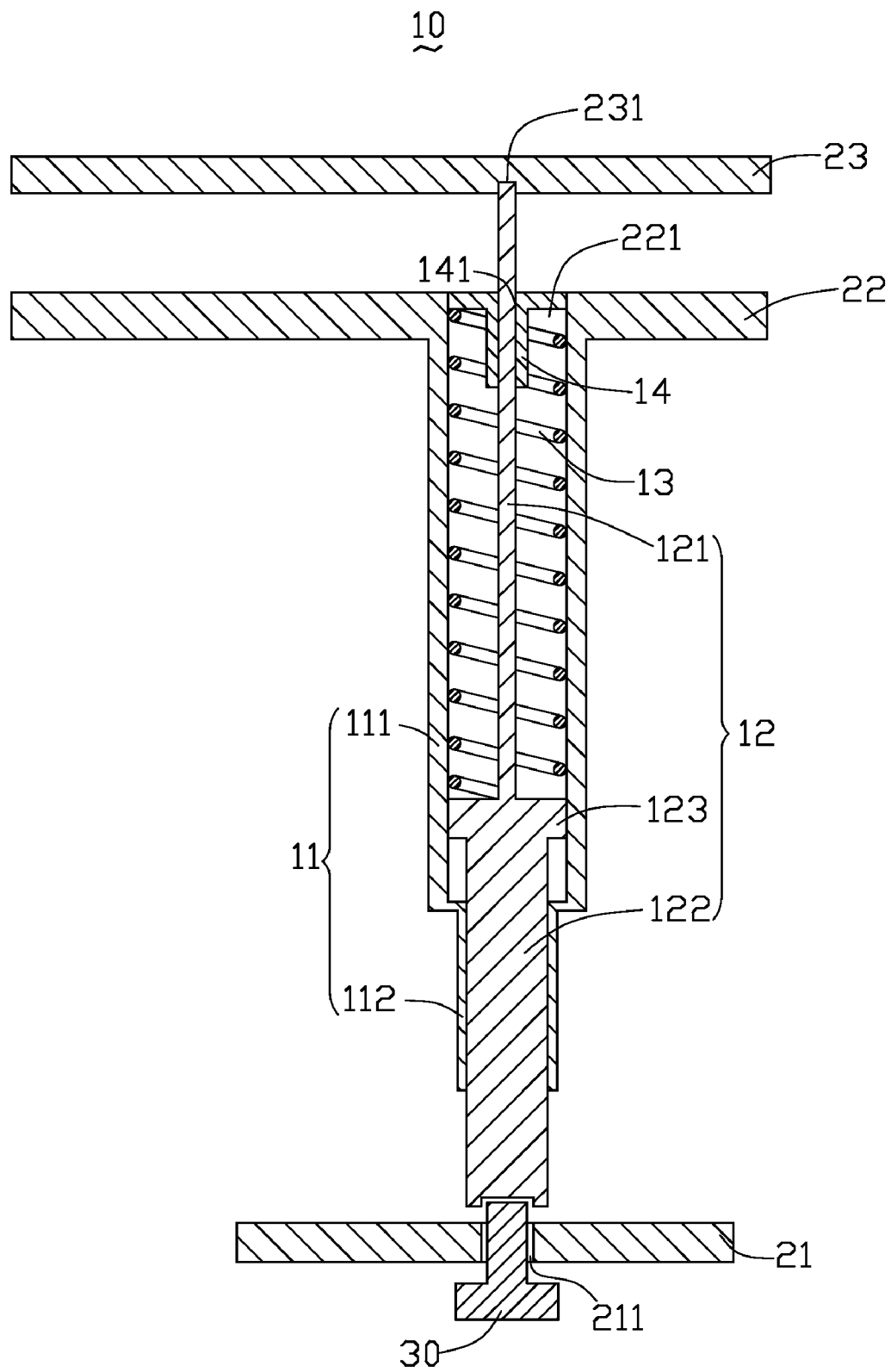
FIG. 2 is a cross-sectional locked view of the disassembling lock of FIG. 1.

Referring to FIG. 2, in the present embodiment, in the process of securing the projector to the ceiling with the screw fasteners 30, a screw fastener 30 thereof will be screwed into the through hole 211 and urge the latching rod 12 to slide inside the sleeve 11, then, the first rod portion 121 will slide to the lamp cover 23 and latch the lamp cover 23 by inserting into the latching groove 231 of the lamp cover 23. Therefore, users cannot disassemble the lamp cover 23 of the projector while the projector is secured to a ceiling. When the projector is taken down from the ceiling, the coil spring 13 will push the latching rod 12 to slide away from the lamp cover 23, accordingly, the lamp cover 23 can then be disassembled from the projector.

While certain embodiments have been described and exemplified above, various other embodiments will be apparent to those skilled in the art from the foregoing disclosure. The present invention is not limited to the particular embodiments described and exemplified, and the embodiments are capable of considerable variation and modification without departure from the scope of the appended claims.

What is claimed is:

1. A projector for mounting on a ceiling, comprising:
    an upper cover for facing the ceiling, the upper cover having a through hole defined therein
    a lower cover opposite to the upper cover, the lower cover having a through hole defined therein, the through hole of the upper cover being aligned with the through hole of the lower cover;
    a lamp cover having a latching groove defined therein, the latching groove facing the lower cover, the lamp cover being slidable relative to the lower cover; and
    a sleeve arranged between the upper cover and the lower cover and aligned with the through holes of the upper cover and the lower cover, the sleeve having a first sleeve portion proximate to the lower cover and a second sleeve portion proximate to the upper cover;
    a latching rod slidably received in the sleeve, the latching rod having a first rod portion, a second rod portion, and a flange formed between the first rod portion and the second rod portion, the flange being restricted to slide inside the first sleeve portion;
    a stop block fixed in the through hole of the lower cover, the stop block defining a hole for extension of the first rod portion therethrough and inserting into the latching groove of the lamp cover; and
    a coil spring coiled around the first rod portion and held between the flange and the stop block.

2. The projector as claimed in claim 1, wherein the sleeve is secured to the lower cover of the projector.

3. The projector as claimed in claim 2, wherein the sleeve is integrally formed with the lower cover.

4. The projector as claimed in claim 1, wherein the internal diameter of the first sleeve portion is bigger than that of the second sleeve portion.

5. The projector as claimed in claim 1, wherein the diameter of the flange is bigger than the internal diameter of the second sleeve portion.

6. The projector as claimed in claim 1, wherein the coil spring is in a compressed state inside the first sleeve portion.

7. A lock for a lamp cover of a projector, the projector comprising an upper cover for facing a ceiling and a lower cover opposite to the upper cover, each of the upper cover and the lower cover having a through hole, comprising:
    a sleeve arranged between the upper cover and the lower cover and aligned with the through holes of the upper cover and the lower cover, the sleeve having a first sleeve portion proximate to the lower cover and a second sleeve portion proximate to the upper cover;
    a latching rod slidably received in the sleeve, the latching rod having a first rod portion, a second rod portion, and a flange formed between the first rod portion and the second rod portion, the flange being restricted to slide inside the first sleeve portion;
    a stop block fixed in the through hole of the lower cover, the stop block defining a hole for extension of the first rod portion therethrough and inserting into the latching groove of the lamp cover; and
    a coil spring coiled around the first rod portion and held between the flange and the stop block.

8. The lock as claimed in claim 7, wherein the sleeve is secured to the lower cover of the projector.

9. The lock as claimed in claim 8, wherein the sleeve is integrally formed with the lower cover.

10. The lock as claimed in claim 7, wherein the internal diameter of the first sleeve portion is bigger than that of the second sleeve portion.

11. The lock as claimed in claim 7, wherein the diameter of flange is bigger than the internal diameter of second sleeve portion.

12. The lock as claimed in claim 7, wherein the coil spring is kept in a compressed state inside the first sleeve portion.

* * * * *